(12) United States Patent
Saladin et al.

(10) Patent No.: US 6,324,040 B1
(45) Date of Patent: Nov. 27, 2001

(54) SENSOR SUPPLY OPEN LOAD DETECTOR CIRCUIT

(75) Inventors: Peter Saladin, Chicago; Michael Moroz, West Chicago, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/416,322

(22) Filed: Oct. 12, 1999

(51) Int. Cl.$^7$ ....................................... H02H 3/00
(52) U.S. Cl. ................................. 361/86; 361/90
(58) Field of Search ................ 361/86, 90, 115, 361/42

(56) References Cited

U.S. PATENT DOCUMENTS 4,583,086 * 4/1986 Andrews et al. .................... 340/640

* cited by examiner

*Primary Examiner*—Stephen W. Jackson

(57) ABSTRACT

A sensor circuit (10) device for detecting an open circuit to an electronic component (20) is disclosed. The sensor circuit (10) includes a detector circuit (12) operatively coupled to the electronic component (20), with the electronic component (20) drawing a known current and with the detector circuit (12) including an energy storage component (24). A charging circuit (14) is arranged to charge the energy storage component (24), and a processing system (16) is operatively coupled to the detector circuit (12). The processing system (16) is arranged to monitor the voltage across the energy storage component, and the processing system determines the fault status indicative of an actual current drawn by the electronic component.

28 Claims, 3 Drawing Sheets

SENSOR SUPPLY OPEN LOAD DETECTOR CIRCUIT

FIELD OF THE INVENTION

The present invention relates generally to sensor circuits, and more particularly, to a sensor circuit having an open load detector circuit.

BACKGROUND OF THE INVENTION

Sensors are being used in a wide variety of automotive electronics applications. The performance of automobile engines, and in many instances the operability and performance of automobile safety systems, depends on sensors. When failures occur, such as open circuits to the sensor power supply, the controlling module cannot operate in accordance with the fault unless the open circuit has been detected. Currently, there is not an easy and cost-effective way to detect the presence of a fault such as, for example, an open circuit to the sensor.

A number of ways exist in the prior art to determine an open circuit in the sensor power supply. For example, one prior art approach is to place a current sense resistor in series with the load (i.e., the sensor) and measure the voltage drop across the resistor. This approach is both burdensome and expensive, in that an operational amplifier and a sense resistor are required. Moreover, power dissipation of the resistor can be very large if a short to ground exists.

Another prior approach to assessing the condition of the sensor circuit has been to remove power from the sensor supply and monitor the decay of the output of the sensor. Such an approach needs to look at the output of the sensor supply and thus requires permanent external circuitry which may ultimately affect the output performance.

Accordingly, there is a continuing need for improved approaches for determining the presence of an open circuit to electronic components such as sensors.

DETAILED DESCRIPTION OF THE PREFERRED EMBODIMENT

Figure 1:
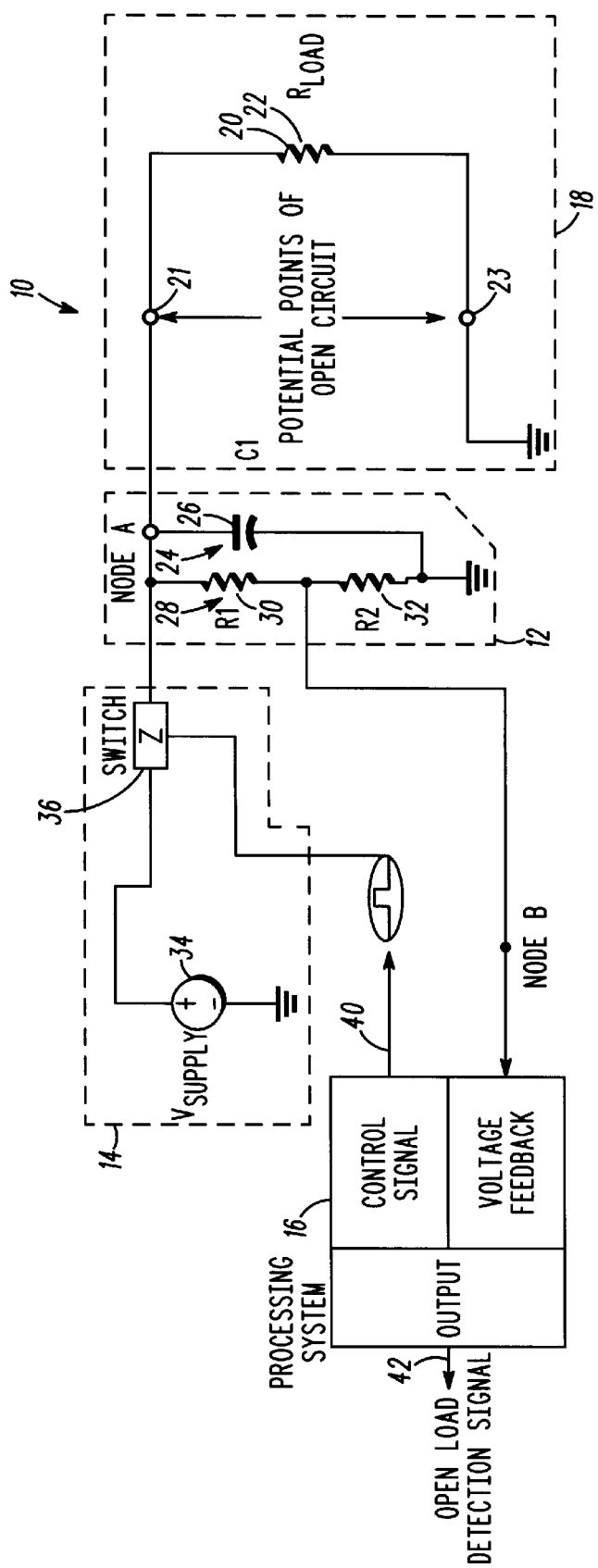
FIG. 1 is a block diagram of a sensor supply open load detector circuit assembled in accordance with the teachings of a preferred embodiment of the present invention.

The following description of the preferred embodiment is not intended to limit the scope of the invention to the precise form disclosed, but instead is intended to be illustrative of the principles of the invention so that others may follow its teachings.

Referring now to the drawings, a sensor circuit 10 constructed in accordance with the teachings of the present invention includes a detector circuit 12 coupled to a charging circuit 14. A processing system 16 is coupled to both the detector circuit 12 and the charging circuit 14. A load circuit 18 includes an electronic component 20, and also includes one or more potential points of open circuit 21, 23. The electronic component is preferably a sensor 22. The sensor 22 may include one or more sensors, which sensors may include any active, passive or resistive load. The sensor is powered from a conventional power supply, such as a power supply 34, as would be known to those skilled in the art.

The detector circuit 12 includes an energy storage device 24, which is preferably a capacitor 26. The detector circuit 12 also includes a resistive network 28, which in the preferred embodiment comprises a first resistor 30 and a second resistor 32 arranged in series. The resistive network 28 is in parallel with the energy storage device 24. It will be noted that the resistance of the resistors 30, 32 is preferably about four (4) times greater than the equivalent resistance of the electronic component 20.

Figure 3:
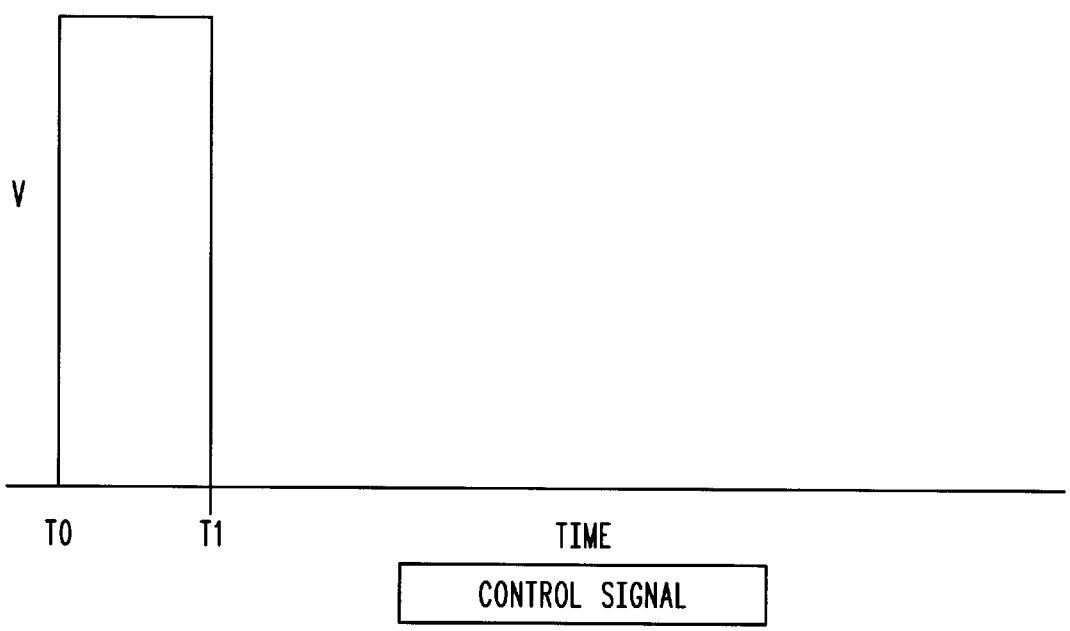
FIG. 3 is a chart illustrating a control signal waveform generated in accordance with the teachings of a preferred embodiment of the present invention.

The charging circuit 14 includes the power supply 34, and further includes a switch 36. The processing system 16, which is preferably a microcontroller, includes a voltage feedback pin 38 at Node B which is connected to the detector circuit 12, preferably between the resistors 30, 32. The processing system 16 is arranged to generate a control signal 40, such as the pulsed waveform shown in FIG. 3, and to communicate the control signal 40 to the switch 36. As shown in FIG. 3, the control signal 40 closes the switch 36 for the duration of the time interval T0–T1, enabling the charging circuit 14 to charge the energy storage component 24 as will be explained in greater detail below. The processing system 16 is further arranged to generate an output signal 42 which is indicative of the load drawn by the electronic component 20.

In operation, the voltage at Node A is the sensor supply voltage, which is initially zero volts (0 volts). Thus, the energy storage device 24 should be fully discharged. This condition should be verified by a reading of zero (0) at the voltage feedback pin 38. The processing system 16 generates the pulsed signal 40 shown in FIG. 3, which in turn enables the switch 36 for the duration of the T0–T1 time interval, which time interval is sufficient to fully charge the energy storage device 24. When the control signal 40 passes through T1, the switch 36 is turned off, thus removing the power supply 34 and deactivating the charging circuit 14. At this point, the energy storage device 24 begins to discharge.

Figure 2:
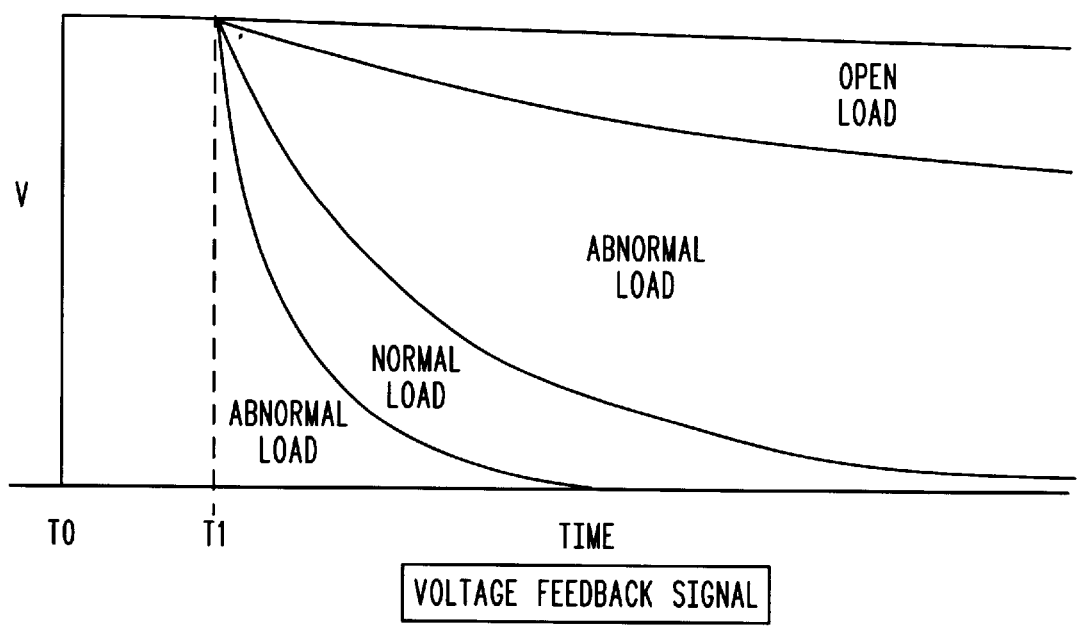
FIG. 2 is a chart illustrating discharge voltage over time and further illustrating the manner by which a voltage feedback signal may be generated in accordance with a preferred embodiment of the present invention.
Figure 4:
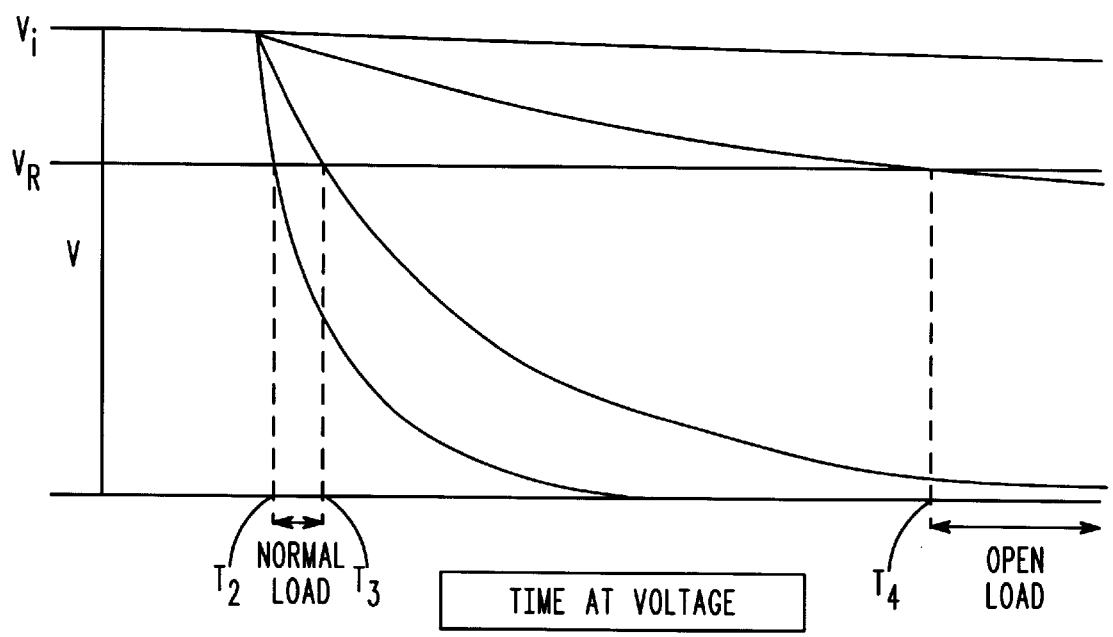
FIG. 4 is a chart illustrating discharge voltage over time and illustrating one manner of generating an output signal based on the amount of time it takes the detector circuit to discharge a known voltage.
Figure 5:
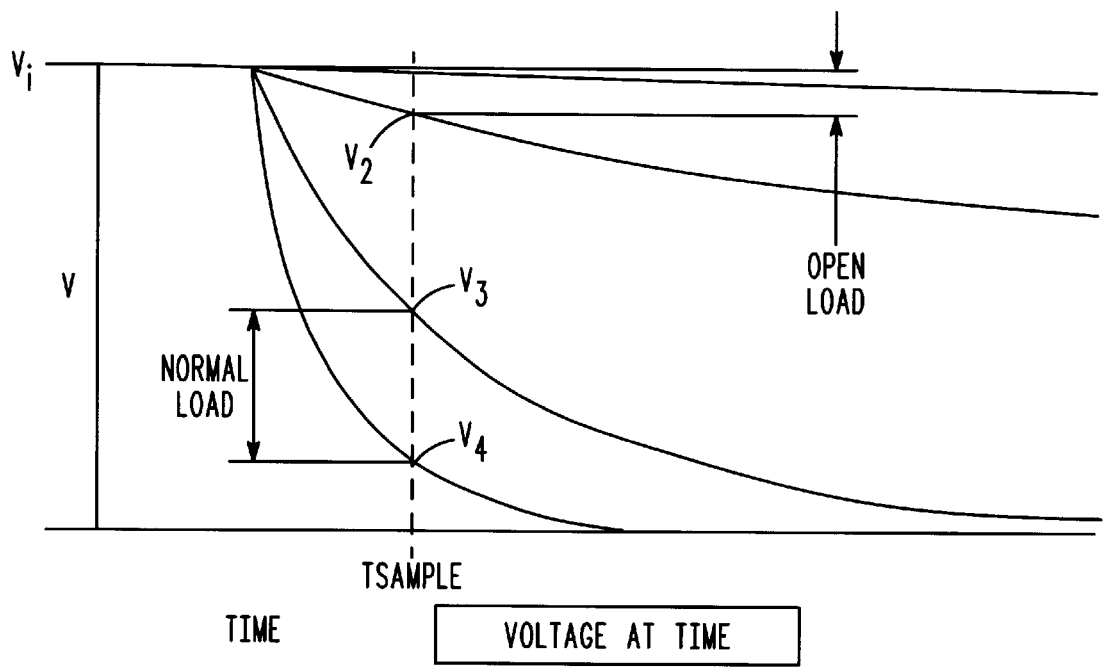
FIG. 5 is a chart illustrating discharge voltage over time and illustrating another manner of generating an output signal based on the amount of voltage discharged from the detector circuit at a known time.

Referring now to FIGS. 2, 4 and 5, with a normal load on the electronic component 20, the energy storage device 24 will have a nominal discharge time constant which is dependent on the current draw of the sensor 20. If the load is not present, such as due to an open circuit at either or both of points 21 and 23, then the discharge time constant for the energy storage device 24 will be dependent solely on the resistors 30, 32. Because the resistance of the resistors 30, 32 are greater than the resistance or equivalent current draw of the electronic component 20, if the load of the electronic component 20 is not present, then the discharge time for such an open circuit condition will be vastly different. The processing system 16 determines the presence or absence of the load based on the difference in the discharge times (i.e., a relatively fast discharge time indicates the presence of the load offered by the electronic component 20, while a relatively slow discharge time indicates the absence of the load offered by the electronic component 20).

The load condition is assessed by monitoring the voltage at Node A. It will be understood that the voltage at Node B is proportional to the voltage at Node A. Because this proportion is known, the sensor supply voltage can be inferred from the voltage at Node B.

Thus, the load condition can be assessed in at least two ways. As shown in FIG. 4, the load condition may be determined by assessing the amount of time the voltage at Node B stays above a reference voltage $V_R$ (i.e., by monitoring the amount of time it takes for the energy storage device 24 to discharge to a predetermined reference voltage). In other words, if the energy storage device discharges from an initial voltage $V_1$; to the reference voltage $V_R$ within the time interval $T_2$ to $T_3$, then the load is normal. Similarly, if the discharge to $V_R$ does not occur until $T_4$ or later, then there is an open load. If the voltage in the energy storage device 24 discharges to $V_R$ between $T_1$ and $T_2$, there is a short circuit to ground or a marginally indeterminate shorted sensor. Further, a time to discharge between $T_3$ and $T_4$ is indicative of an abnormal condition. The processing system 16 then determines the fault status of the sensor and, if required by the specific application, may generate an appropriate output signal 42.

Alternatively, as shown in FIG. 5, the load condition may be determined by assessing the amount of voltage at Node B at a sample time $T_{sample}$ (i.e., by monitoring the amount of voltage discharged by the energy storage device 24 by the time a predetermined time interval has been reached). In other words, if the voltage discharged by the energy storage device 24 at $T_{sample}$ falls between $V_3$ and $V_4$, then the load is normal. If the voltage discharged by the energy storage device 24 at $T_{sample}$ falls between $V_1$, and $V_2$, then the circuit is open. If the voltage discharged by the energy storage device 24 at $T_{sample}$ falls between $V_2$ and $V_3$, then there is an abnormal condition. If the voltage at $T_{sample}$ has fallen below $V_4$, then this would be indicative of a sensor shorted to ground and/or a marginally indeterminate shorted sensor. The processing system 16 then generates the appropriate output signal 42.

As would be understood by those skilled in the art, using the above methodology it would be possible to discriminate open, normal, abnormal and short to ground occurrences on one or more sensors/loads connected to a single supply. Once the processing system determines the fault status of the sensor, the appropriate response would be determined by the specific application.

It will be noted that a sensor circuit 10 constructed in accordance with the teachings of the present invention allows the sensor to be monitored non-intrusively so that the act of monitoring does not impinge on normal circuit performance.

Those skilled in the art will appreciate that, although the teachings of the invention have been illustrated in connection with a certain embodiment, there is no intent to limit the invention to such an embodiment. On the contrary, the intention of this application is to cover all modifications and embodiments fairly falling within the scope of the appended claims either literally or under the doctrine of equivalents.

What is claimed:

1. For use with an electronic component drawing a known current, a device for detecting an open circuit to the electronic component, the device comprising:
    a detector circuit operatively coupled to the electronic component, the detector circuit comprising an energy storage component;
    a charging circuit arranged to charge the energy storage component; and
    a processing system operatively coupled to the detector circuit, the processing system being arranged to monitor the voltage across the energy storage component, the processing system further being arranged to generate an output signal based on an amount of time it takes the energy storage component to discharge a known voltage.

2. The device of claim 1, wherein the charging circuit includes a power supply and a switch, and wherein the processing system is further arranged to generate a control signal for activating the switch to thereby charge the energy storage component.

3. The device of claim 1, wherein the processing system includes a voltage feedback pin.

4. The device of claim 1, wherein the energy storage component comprises a capacitor.

5. The device of claim 1, wherein the energy storage component comprises a capacitor, and wherein the detector circuit includes a resistor in parallel with the capacitor.

6. The device of claim 1, wherein the energy storage component comprises a capacitor, and wherein the detector circuit includes a first resistor and a second resistor in series, the first and second resistors being in parallel with the capacitor.

7. For use with an electronic component drawing a known current, a device for detecting an open circuit to the electronic component, the device comprising:
    a detector circuit operatively coupled to the electronic component, the detector circuit comprising an energy storage component;
    a charging circuit arranged to charge the energy storage component; and
    a processing system operatively coupled to the detector circuit, the processing system being arranged to monitor a voltage across the energy storage component and to generate an output signal based on an amount of voltage discharged from the energy storage component at a known time.

8. The device of claim 5, wherein the resistor is sized to have a resistance greater than the resistance of the electronic component.

9. The device of claim 6, wherein first and second resistors are sized to have a resistance greater than the resistance of the electronic component.

10. The device of claim 1, wherein the electronic component comprises a sensor.

11. The device of claim 10, wherein the sensor is a passive sensor.

12. The device of claim 10, wherein the sensor is an active sensor.

13. The device of claim 1, wherein the electronic component comprises a resistive load.

14. A sensor circuit comprising:
    a detector circuit operatively coupled to a sensor, the sensor drawing a known load, the detector circuit comprising an energy storage component;
    a charging circuit arranged to charge the energy storage component; and
    a processing system operatively coupled to the detector circuit, the processing system being arranged to monitor the voltage discharge of the energy storage component and to thereby generate an output signal based on an amount of time it takes the energy storage component to discharge a known voltage.

15. The sensor circuit of claim 14, wherein the charging circuit includes a power supply and a switch, the switch being arranged to operatively couple the power supply and the electronic component, and wherein the processing system is further arranged to generate a control signal for activating the switch to thereby charge the energy storage component.

16. The sensor circuit of claim 14, wherein the processing system includes a voltage feedback pin being arranged to measure the voltage across the detector circuit.

17. The sensor circuit of claim 14, wherein the energy storage component comprises a capacitor.

18. The sensor circuit of claim 14, wherein the energy storage component comprises a capacitor, and wherein the detector circuit includes a resistor network in parallel with the capacitor.

19. The sensor circuit of claim 18, wherein the resistor network includes a first resistor and a second resistor in series, the resistor network being in parallel with the capacitor.

20. A sensor circuit comprising:
   a detector circuit operatively coupled to a sensor, the sensor drawing a known load, the detector circuit comprising an energy storage component;
   a charging circuit arranged to charge the energy storage component; and
   a processing system operatively coupled to the detector circuit, the processing system being arranged to monitor a voltage discharge of the energy storage component and to thereby generate an output signal based on an amount of voltage discharged from the energy storage device at a known time.

21. The sensor circuit of claim 18, wherein the resistor network has a resistance greater than the resistance of the electronic component.

22. The sensor circuit of claim 19, wherein first and second resistors are sized to have a resistance greater than the resistance of the electronic component.

23. A method for detecting an open circuit in a sensor supply circuit comprising the steps of:
   providing a detector circuit having an energy storage component and a resistive network;
   coupling the detector circuit to the sensor supply circuit;
   charging the energy storage component;
   providing a processing system arranged to measure an amount of time it takes the energy storage component to discharge a known voltage; and
   generating an output signal based on the voltage discharge measurement, the output signal indicative of a load on the sensor supply circuit.

24. The method of claim 23, wherein the energy storage component is a capacitor.

25. The method of claim 23, wherein the resistive network includes a first resistor and a second resistor in series, the first and second resistors being in parallel with the energy storage component.

26. The method of claim 25, wherein the energy storage component is a capacitor.

27. The method of claim 23, including the step of providing a power dissipation path across the resistive network, the power dissipation path having a resistance greater than a resistance of the sensor.

28. A method for detecting an open circuit in a sensor supply circuit comprising the steps of.
   providing a detector circuit having an energy storage component and a resistive network;
   coupling the detector circuit to the sensor supply circuit;
   charging the energy storage component;
   providing a processing system is arranged to measure an amount of voltage discharged from the energy storage component at a known time; and
   generating an output signal based on the voltage discharge measurement, the output signal indicative of a load on the sensor supply circuit.

* * * * *